F. H. RICHARDS.
FEED MECHANISM FOR TYPOGRAPHIC MACHINES.
APPLICATION FILED NOV. 19, 1902. RENEWED MAR. 24, 1908.

919,225.

Patented Apr. 20, 1909.
5 SHEETS—SHEET 1.

Witnesses:
Herbert J. Smith
C. A. Jarvis.

Inventor:
F. H. Richards.

F. H. RICHARDS.
FEED MECHANISM FOR TYPOGRAPHIC MACHINES.
APPLICATION FILED NOV. 19, 1902. RENEWED MAR. 24, 1908.

919,225.

Patented Apr. 20, 1909.

Witnesses:
H. L. Murdock.
E. A. Jarvis.

Inventor:
F. H. Richards.

F. H. RICHARDS.
FEED MECHANISM FOR TYPOGRAPHIC MACHINES.
APPLICATION FILED NOV. 19, 1902. RENEWED MAR. 24, 1908.

919,225.

Patented Apr. 20, 1909.
5 SHEETS—SHEET 4.

Witnesses:
Herbert J. Smith
C. A. Jarvis

Inventor
F. H. Richards

F. H. RICHARDS.
FEED MECHANISM FOR TYPOGRAPHIC MACHINES.
APPLICATION FILED NOV. 19, 1902. RENEWED MAR. 24, 1908.

919,225.

Patented Apr. 20, 1909.

Witnesses:
H. L. Murdock.
E. A. Jarvis

Fig. 18.

Inventor:
F. H. Richards.

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

FEED MECHANISM FOR TYPOGRAPHIC MACHINES.

No. 919,225.            Specification of Letters Patent.        Patented April 20, 1909.

Application filed November 19, 1902, Serial No. 131,987. Renewed March 24, 1908. Serial No. 422,960.

*To all whom it may concern:*

Be it known that I, FRANCIS H. RICHARDS, a citizen of the United States, residing at Hartford, in the county of Hartford and State of Connecticut, have invented certain new and useful Improvements in Feed Mechanism for Typographic Machines, of which the following is a specification.

This invention relates to typographic machines and more especially to the organization with typographic machine elements of means or mechanism for imparting to the article subjected to the action of typographic impressors an intermittent movement, such mechanism being so constructed, organized and related as to have a capacity for varying the distance fed at each step in consonance with the line space values of the impressors whereby there may be produced a proper sequence and alinement of impressions even though the impressors be of varying widths.

In the embodiment of the invention set forth in the present instance, the invention is applied to the imparting of a step by step movement to a blank along whose edge types are formed in succession by means of successively located dies, each of which operates when located at the working point to form a type upon that portion of the blank thereat. The feed mechanism in the form thereof herein disclosed is adapted to feed the blank at each step a distance having a close relation to the width of the respective dies successively used (these dies varying in width to correspond to the variable widths of the letters or characters which they are adapted to form) whereby each type when formed is shifted away from the working point and the next succeeding section of the blank brought to such point ready to be operated upon by the die next operative.

The application of the present invention is not restricted to any proportion or species of blanks used for making a type, logotype or linotype; the invention is equally adapted for feeding in the foregoing manner a blank of any proper length and whose depth corresponds to the type height of the type, as well as one or both members of a component or built up blank from which a type, logotype or linotype not of an integral structure, but of a composite construction, is to be formed.

In the drawings which accompany the present specification and wherein there is set forth one embodiment of my present invention applied to a particular species of typographic machine.

Similar characters of reference designate corresponding parts in all the figures.

For the purpose of disclosing the features of the present invention I have chosen for illustration a simple construction of typographic machine, although it is to be understood that the invention embodies features of the mechanism hereinafter described combined with elements of a typographic machine such as to effect a proper feed operation.

The illustrated typographic machine is adapted to produce a succession of word related types along the edge of a blank through the instrumentality of successively located and operated dies, and in the particular form of machine set forth, a number of dies borne by a carrier may be, any one at a time by the adjustment of the latter, brought to the working point whereupon by the impingement of a suitable striker or plunger the located die may be forced into the edge of the blank and the material thereof impressed to form therefrom a type.

Referring now in detail to the particular machine set forth in the drawings, the mounting for the various parts thereof comprises a base plate B, upon which is erected an upright B¹; the carrier for the dies is designated by C and is in this instance in the nature of a disk journaled to a stud 2 having a threaded shank 2' by which the stud is fixedly secured in a boss 2'' on the base plate connected by a web 2''' with the aforesaid upright B¹. A nut 3 bearing against a washer 3' holds the die carrier against the shoulder formed by the upper surface of the boss 2''; this nut may be immovably secured to the stud 2 by a pin such as 3''. It is by the angular shifting of this carrier that the proper die thereon is brought to the working point and to assist in locating the desired die, there may be provided a pointer or index 4 fixedly secured by a nut such as 4' to the upwardly projecting threaded portion of the stud 2. The dies are located adjacent to the peripheral portion of the carrier and are adapted to have a to and fro sliding movement in a direction transverse to the plane of angular adjustment of the carrier. The dies are designated, without preference, by D, and may obviously correspond in number to the number thereof shown, or a less or greater number may be employed depending upon the use to which the machine is applied. Each die is here provided with a stem or shank d slidably mounted in an opening in the carrier and each such stem or shank may be angular in cross-section to prevent the rotation of the die in the opening in which such stem or shank is located. In the construction shown each die is urged in a direction the reverse of that in which it moves in the act of compressing the blank by a corresponding spring 5, the motion of the die under the tension of the spring being limited by a shoulder-forming collar 5' on the die stem, which is adapted to seat itself in a socket or recess 5'' in the under side of the carrier. It may be here premised, that each die stem is provided with a suitable head such as 5ª against which the plunger or striker already adverted to impinges, the retracting spring 5 being inserted between such head and the adjacent face of the carrier C. The striker or plunger is carried by a slide mounted upon the aforesaid upright B¹ to move in line with the axis of the particular die stem which may, by the adjustment of the carrier C, be brought into alinement with it. This slide is designated by S and is suitably constructed to move longitudinally of guides s on the upright, a gib plate s' being, in this instance, employed as one feature for this purpose and being secured as shown to the slide by screws s''.

The striker or plunger proper is designated by 6 and in the form thereof shown is in the nature of a button or contact piece screwed into the bottom face of the slide in a position such that it will impinge against the head 5ª of any one of the die stems after the same has been brought in alinement with it. A toggle construction is employed for forcing the slide down and causing the plunger or striker to press the die into the blank. This toggle construction as here illustrated comprises an operating handle or lever 7 pivoted by a pin 7' between projecting ears 7'' on the upright and connected by a pair of links 8 (each pivoted at one end by a pin 8' to a laterally projecting portion 7ª of the operating lever) to a boss 8'' on the slide, a pivot pin 8''' passing through the links and the boss. A stop 9 determines the extreme upper position of the slide and the latter when free is caused to be drawn upward by the action of retracting springs 10, each of which may be secured to a pin 10' on the slide, and a corresponding fixed pin 10'' projecting from the upright B¹.

Although not essential, I deem it desirable to employ a centering or precisionizing device for accurately positioning the die carrier with reference to the slide immediately before and during the operation of impressing the blank. This device may comprise a pin 11 projecting from the slide which when a die has been adjusted approximately to the working point enters a recess 11' adjacent to the die (there being one such recess corresponding to each die) and holds the carrier firmly in the correct position to enable the die to properly form the type upon the proper portion of the blank. Preferably the upper edge of this recess 11' will be chamfered or beveled, see the countersink 11'', while the extreme edge of the pin 11 may be beveled as shown to more readily coöperate therewith. A bearing face 12 on the web 2''' and adjacent both to the periphery or the carrier and to the working point is preferably provided for taking the thrust of the die carrier caused by the descending slide.

The blank is designated in a general way by W and although represented as having its body portion integral with the edge portion, which is to be provided with types, it may obviously be of a different construction so far as such integrality is concerned. Moreover, while the blank illustrated has a length corresponding substantially to the length of a line of type, it may obviously be of a greater or less length. Whatever be the form of the blank a suitable guide will ordinarily be formed for its reception, permitting the blank to be shifted lengthwise step by step into the working point of the dies brought in succession to the said working point.

Figure 7:
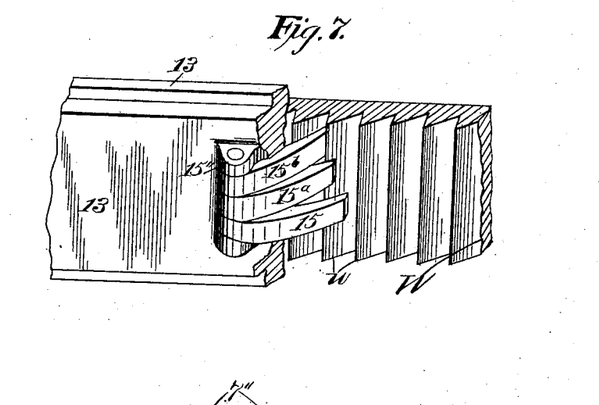
Fig. 7 is a perspective view on an enlarged scale, parts being broken away, of the feed slide, the feed pawls carried thereby, and a portion of a blank with which one of the latter is shown in engagement.

Referring now to the means constituting the particular feature of the present invention, and which when operated serves to effect the step by step movement of the blank, this means in the present illustration comprises a plurality of pawl-like actuators adapted to engage with shoulders formed in or on one of the faces of the blank. With the particular form of actuators shown, and when the same are mounted relatively to the blank as indicated in the drawings, the side face of the blank presented to the actuators will have a series of teeth, an example of which is illustrated at $w$. For conveniently operating the pawl-like actuators I employ in this instance a slide 13 shiftable to and fro in line with the path of the feeding movement which the blank has and having such a position as to enable the actuators mounted thereon to coöperate with the teeth $w$ on the blank in a manner that will be presently described. Guide ribs 13' on this feed slide are adapted to slide in guideways, one of which is in this instance formed in lateral projections 13'' of the web 2''' and the other of which is formed in a detachable piece 14 which, after the slide has been placed in position may be clamped over the same by screws such as 14'. It will be noted that there is mounted on this slide a plurality of pawls. Three separate pawls are here shown, adapting, as will later appear, the present feed mechanism to the impartation of three separate movements, of different amounts, to the blank. In the particular construction and organization illustrated, these pawls 15, $15^a$, $15^b$ are fulcrumed to a pin 15' common to them all, and which extends between projecting ears 15'' on the slide in such a position as to permit the pawls to project through an opening 16 in the slide and beyond the opposite face thereof where they may engage with the teeth formed in the blank. Proper springs 17 may be used to insure such engagement. The pawls aforesaid are of different lengths as measured between their common pivotal axis and their working faces; that is to say, assuming for illustration that the three pawls are in the position illustrated in Fig. 7, one of the pawls will be in contact with the shoulder of the tooth against which it impinges, another of the pawls will overlap the face of such tooth to a certain amount, and finally the third pawl will overlap such face to a greater amount. If, in the event that three pawls are used, and it is desired that the shortest distance which the feed mechanism is capable of feeding the blank shall be one-third of the greatest feed movement, and the intermediate feed movement two-thirds of this latter movement, the intermediate pawl of Fig. 7 will overlap the tooth for one-third of its width and the lower pawl of the figure will overlap such tooth two-thirds of the tooth width.

Figure 5:
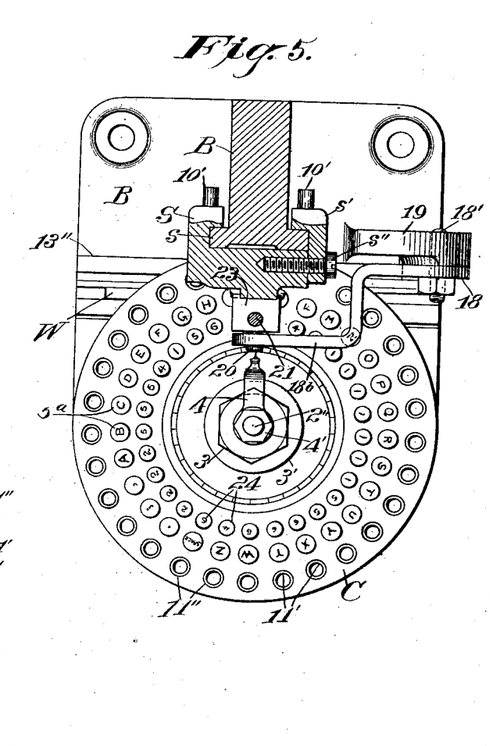
Fig. 5 is a plan view, the upper portion of the machine, however being removed on the plane of the line 5—5 in Fig. 3.

Referring now to the means for actuating the feed slide 13 and thereby shifting the blank through the instrumentality of the pawl which may at any time be engaged with one of its teeth, this is preferably effected through means operative from one or more of the shiftable parts of the machine. In this instance the to and fro movement of the slide is controlled from the reciprocation of the slide S through a lever device which, in the particular organization set forth, comprises an angle lever 18 pivoted intermediate its ends by a pin 18', upon an upright 19 erected on the base. The forked end 18'' of the arm $18^a$ of the angle lever embraces a pin 18''' extending from the feed slide 13. The other arm $18^b$ of the angle lever is slotted at its end, see the slot $18^c$, to receive a pin 20 reciprocative to and fro in line with the similar movement of the slide S. The construction is such that the extent of the reciprocative movement of this pin 20 in unison with the reciprocating slide S may be varied, (the slide being moved through substantially the same distance at each type-making operation) means being provided for arresting the pin at a predetermined point in the line of movement of the slide, after which such slide may continue its independent movement. As a result, I am enabled to vary the throw of the lever 18 and hence vary the extent of the movement imparted thereby to the feed slide 13. To the end of accomplishing the aforesaid results, the pin 20 is mounted upon a part relatively to which the slide S may move, combined with which part are suitable devices for arresting the same in its movement. It may here be premised that the organization is such as to cause the backward movement of the slide 13 and hence the backward movement of the pawls over the teeth on the blank during the downward movement of the slide S, that is a movement thereof during which the die approaches the blank. During the return movement of the slide S, however, the feed slide 13 moves forward and by reason of the engagement of one of the pawls carried thereby with a tooth on the blank, the latter is fed forward to carry the type last made out from under the die and bring the proper portion next in advance along the blank to the working point. The pin 20 is mounted upon a bar 21 slidably mounted on the slide S, and urged downward by a spring 21' encircling the bar and inserted between one wall of a recess 22 in the slide, and a collar 23 affixed to the bar. The contacting of this collar with the lower wall of the recess 22 determines the limiting depressed position of the bar, the tension of the spring 21' being sufficient to cause the rocking of the angle lever 18 during the descent of the slide S and until the bar comes in contact with a stop on the die carrier C. There is one of these stops 24 for each of the dies D, the general disposition of a die, a stop, and a centering recess 11, being radial in this case, see Fig. 5, and the figures on the several stops representing the line space values of the characters or letters, the respective dies for making which are contiguous to them.

It is evident from the foregoing description that the earlier the bar 21 contacts with the stop as the slide S descends, that is the earlier the stoppage in the full downward movement of the slide, the less is the angle lever 18 rocked upon its pivot, and hence the less will the feed slide be drawn backward. Therefore, while the upper surfaces of the heads on the die-stems may all lie substantially in the same plane, the upper surfaces of the several stops 24 will lie in divers planes, due to the fact that different widths are assigned to the characters or letters to which the several stops are correlated.

For convenience in assembling the several stops with their upper faces at relatively different distances from the upper surface of the die carrier C, such stops may be provided with threaded shanks 24' adapted to screw into threaded openings in the carrier, and when a stop has been correctly adjusted to shift the feed slide the proper distance as aforesaid, the stop may be secured in place by a lock nut such as 25.

As has already been stated, the present feed mechanism is adapted to produce three separate amounts of travel of the feed slide, and hence taking the entire assemblage of dies as a whole the stop bar 21 will be arrested from further downward movement as it descends with the slide S, at three different distances from the die carrier. During the first stage of the ascent of the slide S the bar 21 will remain stationary and so continue until the collar 23 thereon, which has been raised from the lower wall of the slot 22 during the descent of the slide, again contacts with such wall, whereupon during the further ascent of the slide the bar will rise in unison with it, reversing the motion of the angle lever 18 and causing the blank to feed forward. It has already been stated that the feed pawls are of three different lengths, and hence during the descent of the slide, one at least of the pawls, the particular one depending upon the distance that the feed slide is drawn backward, will be caused to engage with one of the teeth. This engaging pawl upon the rise of the slide becomes operative to feed the blank forward.

Figure 1:
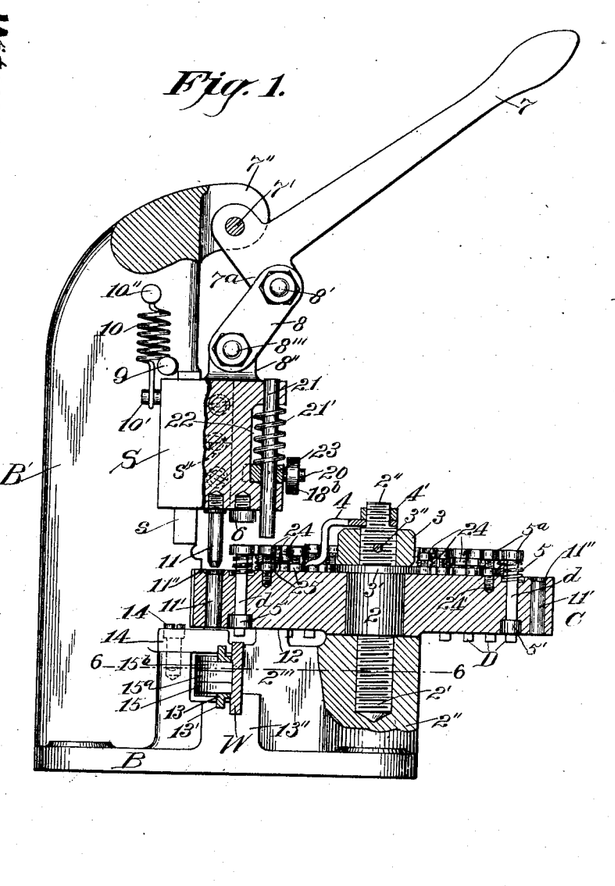
Figure 1 is a side elevation, parts however being shown in section, with the various features comprised in the machine in the position taken by them prior to the operation of impressing the blank to form a type thereon.
Figure 2:
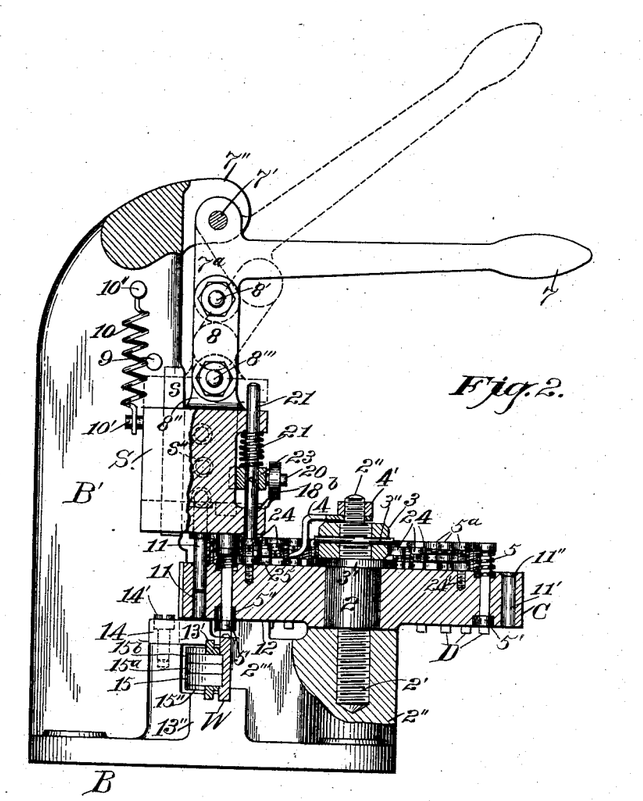
Fig. 2 is a view similar to Fig. 1, but represents a die as having been forced down against the edge of the blank.
Figures 3, 6, 8, 9:
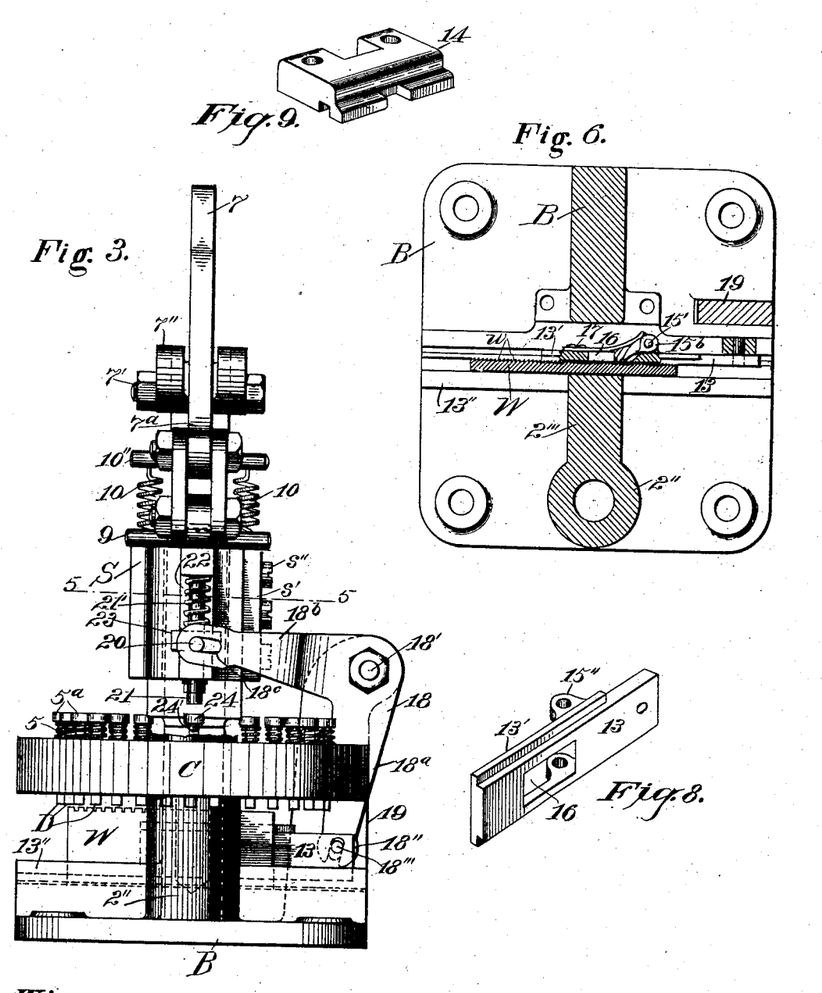
Fig. 3 is an elevation looking from the right of Fig. 1.
Fig. 6 is a sectional view on the plane of the line 6—6 in Fig. 1.
Fig. 8 is a perspective view on a smaller scale of the feed slide with the pawls which it is adapted to carry removed.
Fig. 9 is a similar view of a detachable locking piece for holding the feed slide in position and confining the same to its to and fro movement.
Figure 4:
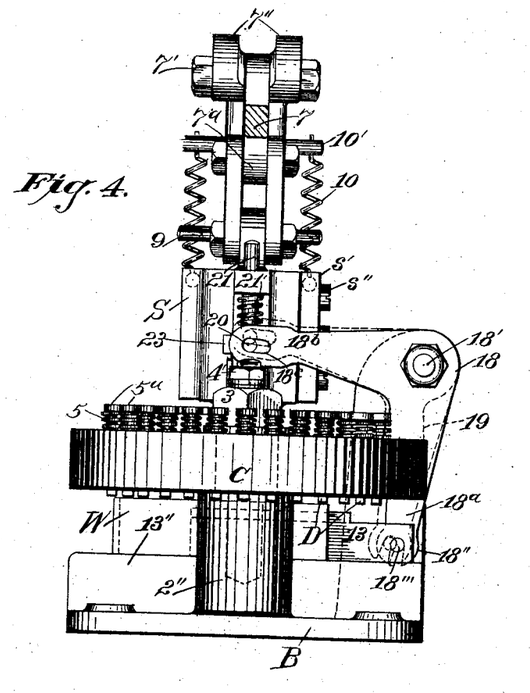
Fig. 4 is an elevation looking from the right of Fig. 2.

A mechanism such as has been hereinbefore described operates substantially in the following manner: Assuming that the parts are in the position represented in Fig. 1, and that a blank has been placed in the machine and the carrier C adjusted to bring a desired die under the contact piece 6 upon then depressing the operating lever 7, the members of the toggle construction straighten out causing the slide S to descend. Sometime prior to the impingement of the contact piece against the head of the die stem directly under it, the pin 11 will enter the proper countersink 11'' precisionizing the position of the carrier. At some time also, prior to such engagement of the contact piece, the bar 21 which, during the descent of the slide S up to that time has swung the angle lever 18 drawing the feed slide 13 backward, will come in contact with the proper stop 24. As the pressure on the lever 7 is continued the slide S continues to descend, but the bar 21 and the parts operative therefrom are restrained from further movement. As the members of the toggle come more and more into alinement with each other, the die is forced downward and into the edge of the blank with an increasing pressure effect, and the type is made. Upon reversing the motion of the lever 7 the slide S begins to ascend and as the collar 23 on the bar 21 contacts with the bottom wall of the recess 22 the bar will begin to ascend. During this movement of the angle lever in unison with the slide, it pushes the feed slide forward and feeds the blank along a step.

Figure 10:
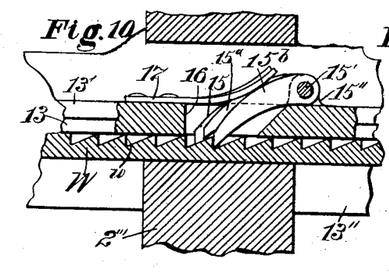
Figs. 10 to 17, inclusive, are sectional detail views drawn upon a somewhat larger scale than the majority of the other figures and indicating the manner in which the feed pawls comprised in the feed mechanism coöperate with the blank to feed the latter a distance determined by the width of the successively operated dies.
Figure 11:
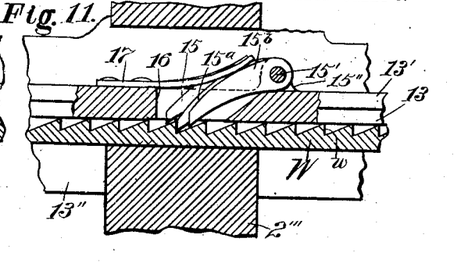
Figure 12:
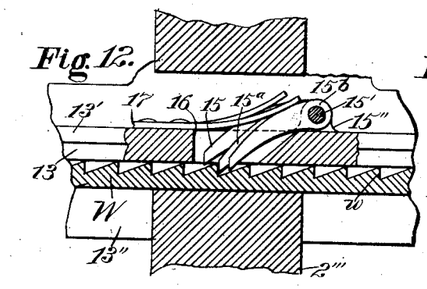
Figure 13:
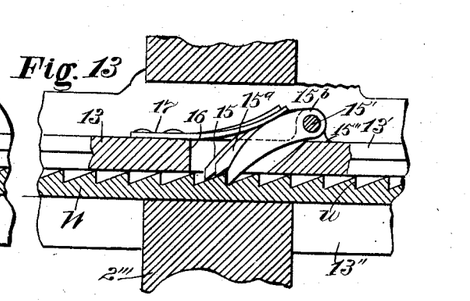
Figure 14:
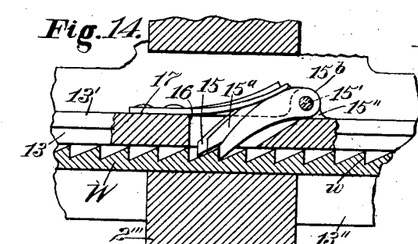
Figure 15:
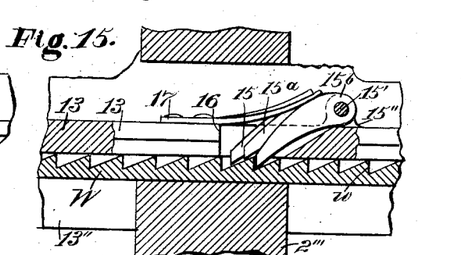
Figure 16:
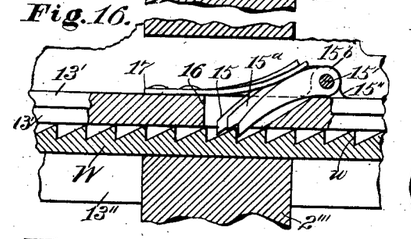
Figure 17:
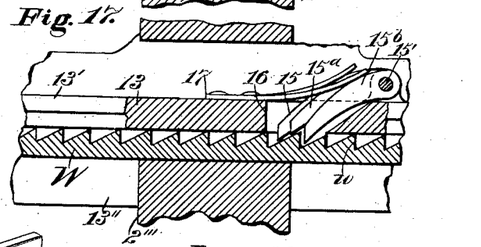
Figure 18:
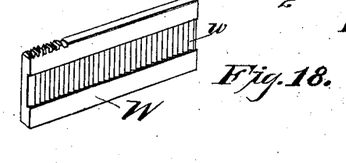
Fig. 18 is a perspective view, drawn to the same scale as Fig. 8, of a blank whose side face is properly formed to coöperate with the feed pawls.

Referring to Figs. 10 to 17, inclusive, in which the operation of the several pawls comprised in the feed device is illustrated, Fig. 10 represents the relative position of the pawls, the feed slide, and the blank at the close of a feed movement. In Fig. 11 the feed slide is assumed to have been drawn backward a sufficient distance to effect, upon the forward movement of the slide, a feed of one-third of a tooth resulting from the engagement of the pawl 15$^a$ with the particular shoulder or tooth with which the pawl 15$^b$ is engaged in Fig. 10. In Fig. 12, the blank has been fed forward this distance, the pawl 15$^a$ still remaining in engagement with the tooth. In Fig. 13 the slide has been drawn backward a distance sufficient to cause the engagement of the pawl 15$^b$ with the tooth immediately at the rear of the engaged tooth of Fig. 12. In this position the advance of the feed slide will result in the feeding forward of the blank, a distance equal to two-thirds of a tooth, Fig. 14 representing the parts at the close of this particular movement. In Fig. 15 the slide is assumed to have been drawn backward sufficiently far to cause the engagement of the pawl 15$^b$ with the next tooth at the rear corresponding to a feed movement of a whole tooth width. Fig. 16 indicates the position of the parts at the close of this particular feed movement. Fig. 17 shows the position of the parts during the backward movement of the slide and as the pawls slide idly over the teeth of the blank.

Having thus described my invention, I claim—

1. The combination with a support for a typebar element, of a plurality of selective dies, feed mechanism comprising a plurality of pawl-like actuators for engaging, one at a time, the teeth of a rack upon said element, and means for actuating said actuators through variable distances in consonance with the line-space values of the respective dies.

2. The combination with a support for a typebar element, of a plurality of selective dies, a plurality of pawl-like actuators mounted to move in unison and singly active, and means interposed between the respective selected dies and the actuators for imparting a variable feed movement to the actuators.

3. The combination with a plurality of selective dies of a rack, a plurality of pawl-like actuators for engaging the rack one at a time, a carrier upon which said actuators are mounted, and means interposed between the respective selected dies and said carrier for imparting a variable movement to the carrier in consonance with the line-space values of the dies.

4. The combination with a plurality of selective dies, of a rack a plurality of pawl-like actuators, a slide upon which said actuators are mounted with their working faces in advance one of the other, and means interposed between the respective selected dies and said slide for imparting a variable movement to the slide in consonance with the line-space values of the dies for causing one of said actuators to engage the rack.

5. The combination with a plurality of selective dies, of a support for a typebar element, a plurality of feed pawls of varying length, a slide upon which said pawls are mounted and by which the same are movable in unison, and means interposed between a working die and said slide for imparting to the slide a movement corresponding in extent to the line-space value of the working die.

6. The combination with a plurality of selective dies, of a support for a typebar element, a plurality of feed pawls adapted to engage one at a time with an element in such support, a slide upon which said pawls are mounted, and a lever connection between the working die and said slide whereby a movement is imparted to said slide in consonance with the line-space value of the working die.

7. The combination with a plurality of selective dies, of a support for a typebar element, a plurality of feed pawls of different lengths adapted to engage with an element in such support, a stop face coördinated with each die for determining the backward movement of said pawls over the element in the support, and means for feeding said pawls forward in the period when a die is out of contact with the element in the support.

8. The combination with a plurality of selective dies, of a carrier upon which said dies are mounted, a plurality of stop faces on said carrier each of which is coördinated with a die, a plurality of feed pawls of varying length adapted to engage with an element in the support, a carrier upon which the pawls are mounted, and means under the control of a moving die for imparting a movement to said pawl carrier the extent of which is determined by the position of the stop-face coördinated with said moving die.

9. The combination with rectilinearly movable dies, of a plurality of feed pawls of varying lengths for imparting a variable feed movement to the blank upon which the dies operate.

10. The combination with an adjustable die carrier provided with a plurality of typemaking dies, of means for precisionizing the said carrier upon its adjustment, mechanism for causing the operation of the die brought by the adjustment of the carrier to the working point, a plurality of feed pawls of varying lengths, a carrier upon which such pawls are mounted, and a connection between the die-operating mechanism and said pawl carrier for imparting a variable movement to the pawl carrier in consonance with the line-space value of the respective dies.

11. The combination with a number of dies, of a support for a typebar element, and a plurality of actuators under the control of the respective dies as to the particular sequence of actuation of the actuators for imparting an intermittent motion to an element in such support.

12. The combination with a die, of a support for a typebar element, and a plurality of actuators under the control of the die in arbitrary sequence for imparting a variable intermittent motion to an element in such support.

13. The combination with a number of dies, of a support for a typebar element, and a plurality of actuators under the control of the dies, which actuators are adapted to engage with an element in such support in a sequence controlled by the dies for imparting an intermittent motion to such element.

14. The combination with a number of dies, of a support for a typebar element, and a plurality of actuators under the control of the dies, which actuators are adapted to engage with an element in such support in a sequence varied by the dies for imparting a variable intermittent motion to such element.

15. In a typographic machine, the combination with a series of selective dies, of mean to actuate the dies and embodying a carrier, a plurality of feed pawls of varying lengths pivotally mounted on said carrier, a lever for reciprocating the carrier, and means controlled by the said die actuating means for operating said lever.

16. In a typographic machine, the combination with a number of selective dies, of means to actuate a selected die, means to hold a blank, a slide shiftable adjacent to the blank, a plurality of feed pawls of varying lengths mounted upon the slide, and a lever connection controlled by the die actuating means for reciprocating the slide.

17. In a typographic machine, the combination with a series of selective dies, of a blank carrier, means for selectively actuating the dies and means for actuating a blank in the carrier and comprising a plurality of feed pawls of varying lengths movable upon the carrier, a lever connection for reciprocating the pawls, and means controlled by said die actuating means for operating said lever.

18. In a typographic machine, the combination with a series of selective dies, of a blank carrier and means to actuate the same, means to actuate the dies, a plurality of pawls of varying lengths for engaging a blank in said carrier, and means actuated by the die actuating means for actuating said pawls.

19. The combination with a series of dies and means for selectively operating the same, of a typebar blank support, a reciprocatory slide adjacent to said support, a series of pawls mounted on the slide for engaging feed faces on a blank in the support, the active faces of the pawls being disposed in a series longitudinally of the support, and means associated with the selection and operation of each die for reciprocating the slide a selective distance.

Signed at Nos. 9-15 Murray st., New York, N. Y., this 18th day of November, 1902.

FRANCIS H. RICHARDS.

Witnesses:
   PIERSON L. WELLS,
   JOHN O. SEIFERT.